US011875266B2

(12) United States Patent
Tsuchiya et al.

(10) Patent No.: US 11,875,266 B2
(45) Date of Patent: Jan. 16, 2024

(54) IMAGE DETERMINATION DEVICE, IMAGE DETERMINATION METHOD, AND NON-TRANSITORY COMPUTER READABLE MEDIUM STORING PROGRAM

(71) Applicant: OMRON Corporation, Kyoto (JP)

(72) Inventors: Naoki Tsuchiya, Otsu (JP); Yoshihisa Ijiri, Tokyo (JP); Yu Maruyama, Tokyo (JP); Yohei Okawa, Koshigaya (JP); Kennosuke Hayashi, Tokyo (JP); Sakon Yamamoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 510 days.

(21) Appl. No.: 17/270,429

(22) PCT Filed: Nov. 14, 2019

(86) PCT No.: PCT/JP2019/044743
§ 371 (c)(1),
(2) Date: Feb. 22, 2021

(87) PCT Pub. No.: WO2020/137229
PCT Pub. Date: Jul. 2, 2020

(65) Prior Publication Data
US 2021/0312235 A1 Oct. 7, 2021

(30) Foreign Application Priority Data
Dec. 27, 2018 (JP) ................................ 2018-245670

(51) Int. Cl.
G06N 3/084 (2023.01)
G06F 18/214 (2023.01)
G06F 18/21 (2023.01)
G06V 10/762 (2022.01)
G06V 10/774 (2022.01)
G06V 10/776 (2022.01)

(52) U.S. Cl.
CPC ........... *G06N 3/084* (2013.01); *G06F 18/217* (2023.01); *G06F 18/2148* (2023.01);
(Continued)

(58) Field of Classification Search
CPC ... G06N 3/084; G06F 18/2148; G06F 18/217; G06V 10/762; G06V 10/7747; G06V 10/776; G06V 2201/06
(Continued)

(56) References Cited

U.S. PATENT DOCUMENTS

2002/0165839 A1* 11/2002 Taylor ................... G06F 18/211
706/20
2017/0069075 A1* 3/2017 Okuda ................. G06V 10/764

FOREIGN PATENT DOCUMENTS

JP H0934862 A * 7/1995 ........... G06K 9/6218
JP H0934862 2/1997
(Continued)

OTHER PUBLICATIONS

"International Search Report (Form PCT/ISA/210) of PCT/JP2019/044743," dated Jan. 21, 2020, with English translation thereof, pp. 1-2.
(Continued)

Primary Examiner — Juan A Torres
(74) Attorney, Agent, or Firm — JCIPRNET

(57) ABSTRACT

An image determination device includes: a training model which outputs, on the basis of an image to be examined, output data indicating a determination result about the image; a training part which trains the training model to output, by using training data including a training image and label data, output data indicating the label data associated with the training image, when the training image is input to the training model; a dividing part which divides the training data into a plurality of pieces of sub-training data; a measurement part which measures accuracy of determination when the training part trains the training model by using each of the plurality of pieces of sub-training data; and selection part which selects at least any one among the plurality of pieces of sub-training data on the basis of the accuracy of determination.

6 Claims, 7 Drawing Sheets

(52) U.S. Cl.
CPC .......... *G06V 10/762* (2022.01); *G06V 10/776* (2022.01); *G06V 10/7747* (2022.01)

(58) Field of Classification Search
USPC ......................................................... 382/159
See application file for complete search history.

(56) References Cited

FOREIGN PATENT DOCUMENTS

| | | | | |
|---|---|---|---|---|
| JP | 2010152751 | | 7/2010 | |
| JP | 2010152751 A | * | 7/2010 | |
| JP | 2017049974 | | 3/2017 | |
| JP | 2017049974 A | * | 3/2017 | ........... G06K 9/2027 |

OTHER PUBLICATIONS

"Written Opinion of the International Searching Authority (Form PCT/ISA/237) of PCT/JP2019/044743," dated Jan. 21, 2020, with English translation thereof, pp. 1-7.

Chuan Liu et al : "An efficient instance selection algorithm to reconstruct training set for support vector machine", Knowledge-Based Systems, Nov. 2016, pp. 1-16.

Wikipedia, "Instance selection", retrieved on Jul. 18, 2022, https : //en.wikipedia.org/w/index.php?title=Instance_selection&oldid= 874153020.

"Search Report of Europe Counterpart Application", dated Jul. 29, 2022, p. 1-p. 10.

* cited by examiner

IMAGE DETERMINATION DEVICE, IMAGE DETERMINATION METHOD, AND NON-TRANSITORY COMPUTER READABLE MEDIUM STORING PROGRAM

CROSS-REFERENCE TO RELATED APPLICATION

This application is a 371 application of the International PCT application serial no. PCT/JP2019/044743, filed on Nov. 14, 2019, which claims the priority benefits of Japan Patent Application No. 2018-245670, filed on Dec. 27, 2018. The entirety of each of the above-mentioned patent applications is hereby incorporated by reference herein and made a part of this specification.

TECHNICAL FIELD

The present invention relates to an image determination device, an image determination method, and a non-transitory computer readable medium storing an image determination program.

BACKGROUND ART

In the related art, automatic control using image processing has been widely put into practical use in the field of factory automation (FA). For example, a step of capturing an image of an examination target such as a work piece and examining the quality of the work piece on the basis of a feature amount extracted from the captured image is realized.

For example, Patent Literature 1 discloses a device that determines whether or not there is a defect, which is an examination target, on the basis of an output result of an identification device that trains using an image to be examined and captured under a plurality of imaging conditions for training data. Specifically, the device disclosed in Patent Literature 1 includes a training extraction means, a selection means, and a generation means. The training extraction means extracts a feature amount of each of at least two images based on images captured under at least two different imaging conditions with respect to an object whose exterior quality is known. The selection means selects a feature amount for determining the quality of an object from the feature amount spanning the feature amounts extracted from the at least two images by the training extraction means. The generation means generates an identification device for determining the quality of an object on the basis of the feature amount selected by the selection means.

CITATION LIST

Patent Literature

[Patent Literature 1]
Japanese Patent Laid-Open No. 2017-49974

SUMMARY

Technical Problem

In a case where determination regarding the presence or absence of a defect, the type of work piece, or the like is performed on an image to be examined using a training model, a training model may be generated through supervised training to output a correct determination result in a case where an image is input to a training model using training data including the image and the correct determination result. However, when additional training is performed by increasing the number of pieces of the training data, the accuracy of determination of the training model is not improved or is only slightly improved, while time required for training processing and the amount of computation may increase.

Consequently, the present invention provides an image determination device, an image determination method, and a non-transitory computer readable medium storing an image determination program which are capable of suppressing increases in time required for training processing and the amount of computation even when additional training of a training model is performed.

Solution to Problem

An image determination device according to an aspect of the present invention includes a training model which outputs output data indicating a determination result related to an image to be examined on the basis of the image, a training part which causes the training model to train to output the output data indicating label data associated with a training image in a case where the training image is input to the training model using training data including the training image and the label data, a division part which divides the training data into a plurality of pieces of sub-training data, a measurement part which measures the accuracy of determination in a case where the training model is trained by the training part using each of the plurality of pieces of sub-training data, and a selection part which selects at least one of the plurality of pieces of sub-training data on the basis of the accuracy of determination.

According to the aspect, it is possible to perform additional training of a training model using a smaller number of pieces of sub-training data than the number of pieces of training data, and it is possible to suppress increases in time required for training processing and the amount of computation even when additional training of a training model is performed.

In the above-described aspect, the division part, the measurement part, and the selection part may recursively repeat respective processes in a case where a predetermined condition based on comparison between accuracy of determination in a case where the training model is trained by the training part using the training data and the accuracy of determination in a case where the training model is trained by the training part using the sub-training data selected by the selection part is satisfied.

According to the aspect, it is possible to further suppress increases in time required for training processing and the amount of computation by decreasing the number of pieces of training data in a stepwise manner while suppressing a reduction in the accuracy of determination and improving the accuracy of determination.

In the above-described aspect, the division part may divide the training data into the plurality of pieces of sub-training data that do not overlap each other.

According to the aspect, it is possible to reduce the number of pieces of data used for the training of a training model.

In the above-described aspect, the division part may divide the training data into the plurality of pieces of sub-training data that may overlap each other.

According to the aspect, it is possible to reduce the number of pieces of data used for the training of a training model.

In the above-described aspect, the division part may divide the training data into the plurality of pieces of sub-training data by clustering the training data according to a predetermined standard and extracting one or a plurality of pieces of representative data from a plurality of clusters.

According to the aspect, it is possible to reduce the number of pieces of data used for the training of a training model.

An image determination method according to another aspect of the present invention includes causing a training model which outputs output data indicating a determination result related to an image to be examined on the basis of the image to train to output the output data indicating label data associated with a training image in a case where the training image is input to the training model using training data including the training image and the label data, dividing the training data into a plurality of pieces of sub-training data, measuring the accuracy of determination in a case where the training model is trained using each of the plurality of pieces of sub-training data, and selecting at least one of the plurality of pieces of sub-training data on the basis of the accuracy of determination.

According to the aspect, it is possible to perform additional training of a training model using a smaller number of pieces of sub-training data than the number of pieces of training data, and it is possible to suppress increases in time required for training processing and the amount of computation even when additional training of a training model is performed.

A non-transitory computer readable medium storing an image determination program according to still another aspect of the present invention causes a computation part included in an image determination device to function as a training model which outputs output data indicating a determination result related to an image to be examined on the basis of the image, a training part which causes the training model to train to output the output data indicating label data associated with a training image in a case where the training image is input to the training model using training data including the training image and the label data, a division part which divides the training data into a plurality of pieces of sub-training data, a measurement part which measures the accuracy of determination in a case where the training model is trained by the training part using each of the plurality of pieces of sub-training data, and a selection part which selects at least one of the plurality of pieces of sub-training data on the basis of the accuracy of determination.

According to the aspect, it is possible to perform additional training of a training model using a smaller number of pieces of sub-training data than the number of pieces of training data, and it is possible to suppress increases in time required for training processing and the amount of computation even when additional training of a training model is performed.

Advantageous Effects of Invention

According to the present invention, it is possible to provide an image determination device, an image determination method, and a non-transitory computer readable medium storing an image determination program which are capable of suppressing increases in time required for training processing and the amount of computation even when additional training of a training model is performed.

DESCRIPTION OF THE EMBODIMENTS

Hereinafter, an embodiment according to an aspect of the present invention (hereinafter, also referred to as "the present embodiment") will be described with reference to the accompanying drawings. However, the embodiment to be described below is merely an example of the present invention in all respects. It is needless to say that various improvements and modifications can be made without departing from the scope of the present invention. That is, a specific configuration according to the embodiment may be appropriately adopted when implementing the present invention. Meanwhile, data appearing in the present embodiment is described in natural language, but more specifically designated in a pseudo language, commands, parameters, machine language, or the like that can be recognized by a computer.

§ 1 Application Example

Figure 1:
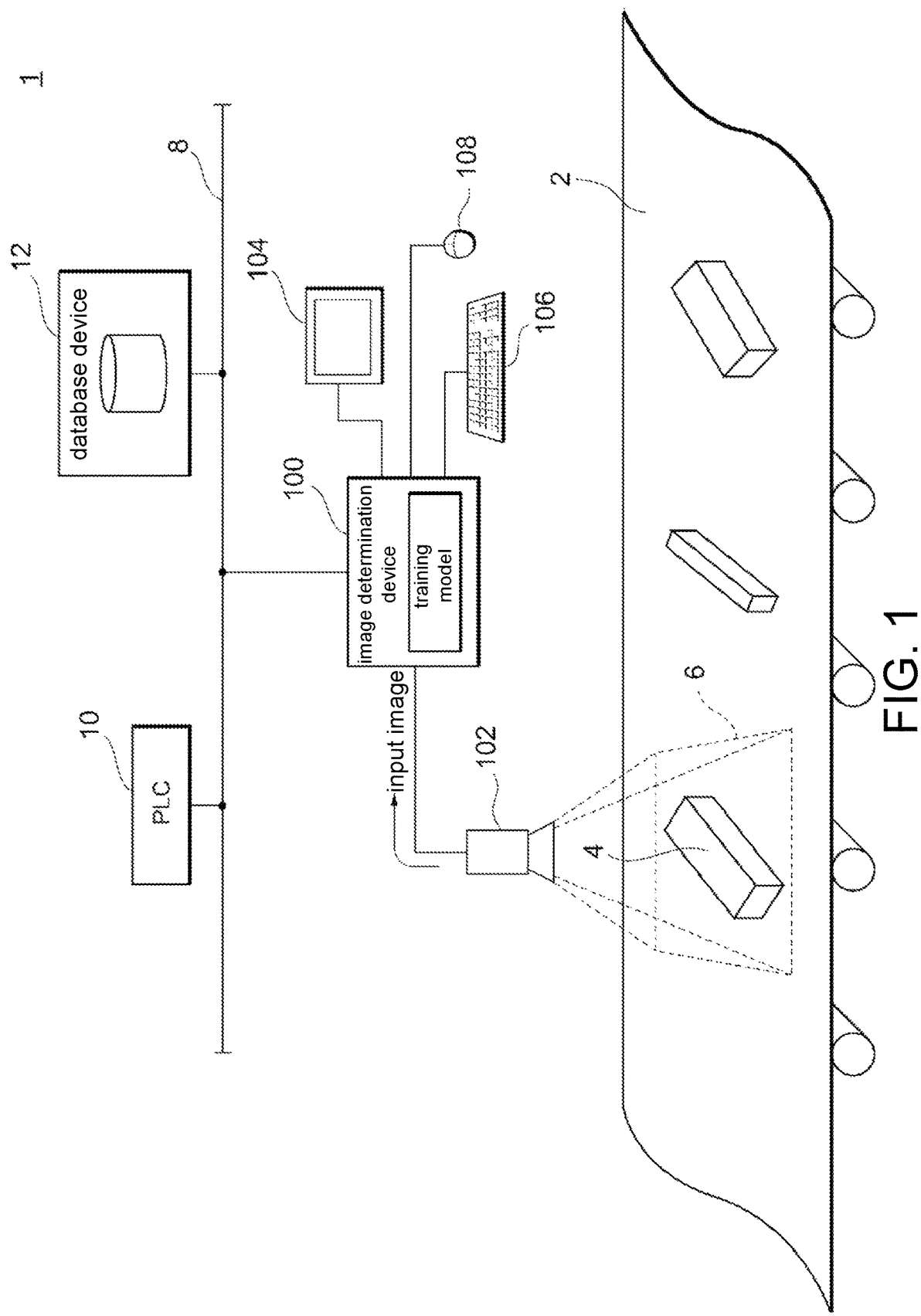
FIG. 1 is a diagram illustrating a configuration example of an image determination system according to an embodiment of the present invention.

FIG. 1 is a diagram illustrating a configuration example of an image determination system 1 according to an embodiment of the present invention. First, an example of a situation to which the present invention is applied will be described. The image determination system 1 according to the present embodiment analyzes an input image generated by capturing an image of an examination target using a training model included in an image determination device 100 and performs examination of a defect and classification of the target. The training model may be trained in advance to classify the presence or absence of a defect with respect to an examination target and the type of examination target by using training data. In addition, the training model may be additionally trained by dividing training data into a plurality of pieces of sub-training data, selecting any one piece of sub-training data, and using the selected sub-training data. Meanwhile, an examination target includes, for example, work pieces such as parts and products in a manufacturing process.

As illustrated in FIG. 1, for example, the image determination system 1 realizes exterior examination or exterior measurement of a work piece 4 which is an examination target conveyed on a belt conveyor 2 by performing image measurement processing on an input image obtained by capturing the work piece 4. In the following description, an example applied to examination of the presence or absence of a defect on the surface of the work piece 4, and the like will be described as a typical example of image measurement processing. However, the present invention is not limited thereto, and the example can also be applied to specification of the type of defect, dimensional measurement of an exterior shape of a defect, specification of the type of work piece 4, and the like.

A camera 102 which is an imaging part is disposed above the belt conveyor 2, and an imaging visual field 6 of the camera 102 is configured to include a predetermined region of the belt conveyor 2. Image data (hereinafter, also referred to as an "input image") generated by the imaging of the camera 102 is transmitted to the image determination device 100. The imaging of the camera 102 is executed periodically or when an event occurs.

The image determination device 100 is connected to a programmable controller (PLC) 10, a database device 12, and the like through a high-order network 8. A measurement result in the image determination device 100 may be transmitted to the PLC 10 and/or the database device 12. Meanwhile, any device may be connected to the high-order network 8, in addition to the PLC 10 and the database device 12.

A display 104 for displaying a state during processing, measurement results, and the like, and a keyboard 106 and a mouse 108 serving as input parts receiving a user's operation may be connected to the image determination device 100.

The image determination device 100 includes a training model generated through machine training. The training model outputs output data indicating a determination result related to an image to be examined on the basis of the image. For example, the training model may include one or a plurality of feature extractors and a determiner. The one or plurality of feature extractors receive an image as an input and output feature data indicating a specific feature of the image. The determiner outputs output data indicating a determination result regarding the image on the basis of the feature data output from the one or plurality of feature extractors. Here, the one or plurality of feature extractors may include, for example, an edge extractor that extracts an edge included in the image, a planar part extractor that extracts a planar region included in the image, a background pattern extractor that extracts a background pattern of the image, a binarization region extractor that extracts a binarization region included in the image, and the like. The one or plurality of feature extractors may be a model for extracting a single feature that is easy for individual persons to understand, may be a machine training model, or may be a rule-based model. The determiner receives one or a plurality of pieces of feature data as inputs and outputs output data indicating a determination result regarding an image. The output data may be data indicating, for example, the presence or absence of a defect which is an examination target, the type of defect, dimensions of an exterior shape of a defect, the type of examination target, and the like. The determiner may be constituted by, for example, a neural network, or may be trained in advance to output desired output data by using training data.

Examination conditions such as the type of work piece 4 flowing on a production line and imaging conditions vary depending on a production line and do not necessarily match conditions at the time of training. For this reason, when a preliminarily trained training model is used for a production line, erroneous determination results may be output. Consequently, a training model may be additionally trained by adding images that cannot be correctly determined by the training model to training data. At this time, the accuracy of determination of the training model is not improved or is only slightly improved even when the number of pieces of training data is increased, while time required for training processing and the amount of computation may increase.

In view of such circumstances, the image determination device 100 according to the present embodiment divides training data into a plurality of pieces of sub-training data, causes a training model to train using each of the plurality of pieces of sub-training data, and selects at least one of the plurality of pieces of sub-training data on the basis of the accuracy of determination. As a result, a set of the selected sub-training data and an additional training model trained using the sub-training data is obtained, and the image determination device 100 performs image determination using the additional training model trained with a smaller number of pieces of data. In this manner, even when additional training of the training model is performed, it is possible to suppress increases in time required for training processing and the amount of computation.

§ 2 Configuration Example

[Hardware Configuration]

Figure 2:
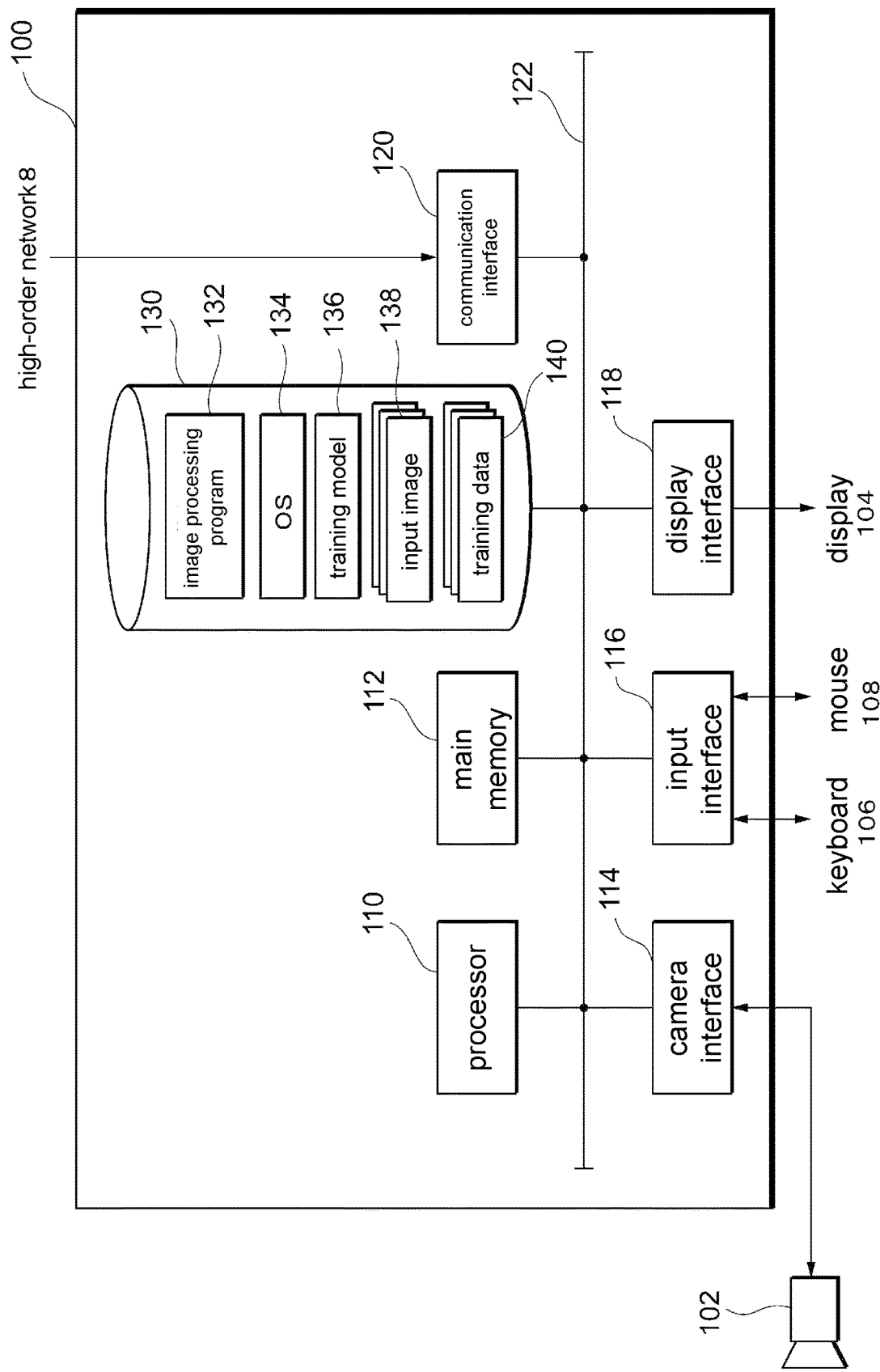
FIG. 2 is a diagram illustrating a hardware configuration of an image determination device according to the present embodiment.

FIG. 2 is a diagram illustrating a hardware configuration of the image determination device 100 according to the present embodiment. The image determination device 100 may be realized using a general-purpose computer configured in accordance with general-purpose computer architecture as an example. The image determination device 100 includes a processor 110, a main memory (main storage part) 112, a camera interface 114, an input interface 116, a display interface 118, a communication interface 120, and a storage (auxiliary storage part) 130. Typically, these components are communicatively connected to each other through an internal bus 122.

The processor 110 realizes functions and processes as described in detail using the next drawing and the subsequent drawings by loading programs stored in the storage 130 in the main memory 112 and executing the programs. The main memory 112 is constituted by a volatile memory and functions as a work piece memory required to execute a program by the processor 110.

The camera interface is an example of an acquisition part. The camera interface 114 is connected to the camera 102 to acquire an input image captured by the camera 102. The camera interface 114 may give an instruction for an imaging timing or the like to the camera 102.

The input interface 116 is connected to input parts on which a user's operation is performed, such as the keyboard 106 and the mouse 108. The input interface 116 acquires a command indicating an operation performed on the input part by the user, or the like.

The display interface 118 is connected to the display 104 serving as a display part. The display interface 118 outputs various processing results generated by executing programs by the processor 110 to the display 104.

The communication interface 120 takes charge of processing for communicating with the PLC 10, the database device 12, and the like through the high-order network 8.

The storage 130 stores programs for causing a computer to function as the image determination device 100, such as an image processing program 132 and an operating system (OS) 134 for realizing a training model 136. The storage 130 may further store a training model 136, an input image 138 acquired from the camera 102, and training data 140 which is used to train the training model 136. Meanwhile, the training data 140 may be acquired from external equipment such as the database device 12 through the high-order network 8 or may be temporarily stored in the storage 130.

The image processing program 132 stored in the storage 130 may be installed in the image determination device 100 through an optical recording medium such as a digital versatile disc (DVD), a semiconductor recording medium such as a universal serial bus (USB) memory, or the like. Alternatively, the image processing program 132 may be downloaded from a server device or the like on a network.

The image processing program 132 according to the present embodiment does not include all software modules for realizing functions according to the present embodiment, and may cause necessary functions to be provided in cooperation with the OS 134.

The image processing program 132 according to the present embodiment may be provided by being incorporated into a portion of another program. Also in this case, the image processing program 132 itself does not include a module included in the other program to be combined as described above, and processing is executed in cooperation with the other program. In this manner, the image processing program 132 according to the present embodiment may be configured to be incorporated into another program.

FIG. 2 illustrates an example in which the image determination device 100 is realized using a general-purpose computer. However, the present invention is not limited thereto, and all or some of the functions thereof may be realized using a dedicated circuit (for example, an application specific integrated circuit (ASIC), a field-programmable gate array (FPGA), or the like). Further, an external device connected through a network may take charge of some processes.

[Functional Configuration]

Figure 3:
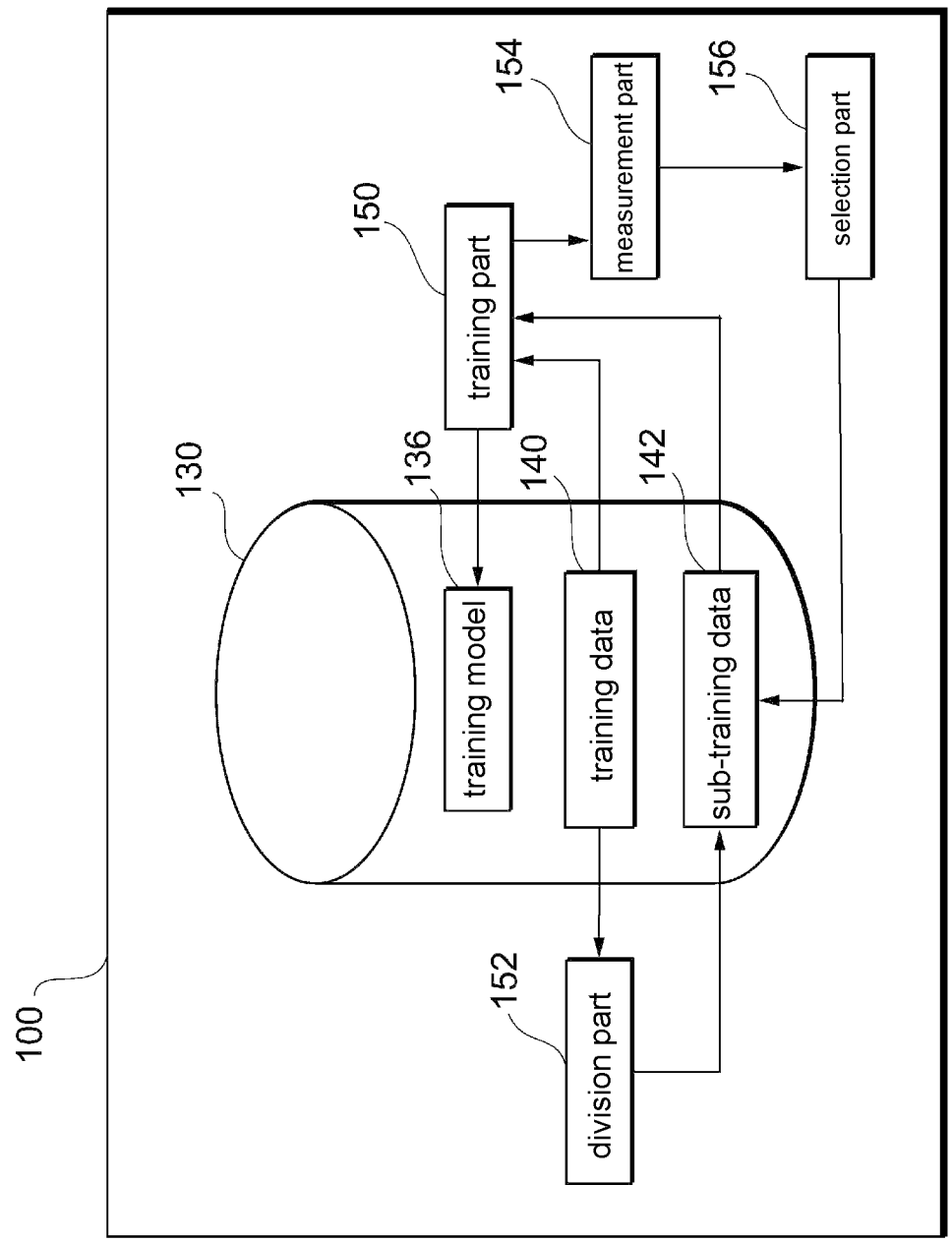
FIG. 3 is a diagram illustrating functional blocks of the image determination device according to the present embodiment.

FIG. 3 is a diagram illustrating functional blocks of the image determination device 100 according to the present embodiment. The image determination device 100 includes the training model 136 stored in the storage 130, a training part 150, a division part 152, a measurement part 154, and a selection part 156.

The training model 136 outputs output data indicating a determination result related to an image to be examined, on the basis of the image. The training model 136 may have any configuration, but it may be constituted by, for example, a neural network. The training model 136 may be generated through supervised training, and the training data 140 stored in the storage 130 may be used for the supervised training.

The training part 150 causes the training model 136 to train to output output data indicating label data associated with a training image in a case where the training image is input to the training model 136 using the training data 140 including the training image and the label data. In a case where the training model 136 is constituted by a neural network, the training part 150 may execute training processing of the training model 136 by a back-propagation method.

The division part 152 divides the training data 140 into a plurality of pieces of sub-training data 142. The division part 152 may divide the training data 140 into a plurality of pieces of sub-training data 142 that do not overlap each other. For example, the division part 152 may generate the plurality of pieces of sub-training data 142 by randomly dividing training data into N groups so that the groups do not overlap each other. In this manner, it is possible to reduce the number of pieces of data used for the training of the training model.

The division part 152 may divide the training data 140 into a plurality of pieces of sub-training data 142 that may overlap each other. For example, the division part 152 may generate the same number of pieces of sub-training data 142 as the number of pieces of training data by performing similar processing on all pieces of data using the remaining data obtained by extracting one piece of data from the training data as sub-training data. In this case, the number of pieces of sub-training data 142 is smaller than the number of pieces of training data 140 by one. In this manner, it is possible to reduce the number of pieces of data used for the training of a training model.

The division part 152 may divide the training data 140 into a plurality of pieces of sub-training data 142 by clustering the training data 140 according to a predetermined standard and extracting one or a plurality of pieces of representative data from a plurality of clusters. For example, the division part 152 may divide the training data 140 into a plurality of pieces of sub-training data 142 by repeating processing for clustering the training data 140 according to features of a training image included in the training data 140 and randomly extracting one piece of data from a plurality of clusters. More specifically, the division part 152 may divide the training data 140 into a plurality of pieces of sub-training data 142 by repeating, for example, processing for creating K clusters by a K-means method and extracting data from each of the clusters using a pixel value of the training data 140 as vector data. In this manner, it is possible to reduce the number of pieces of data used for the training of a training model.

The measurement part 154 measures the accuracy of determination in a case where the training model 136 is trained by the training part 150 using each of the plurality of pieces of sub-training data 142. The accuracy of determination may be indicated by a difference from the accuracy of determination in a case where the training model 136 is trained using the training data 140. In addition, the accuracy of determination may include a plurality of amounts calculated according to a plurality of standards such as an accuracy, a precision, an F1 value, a receiver operating characteristic (ROC) curve, and an area under curve (AUC). Specifically, when a determination result is true and the percentage of correct answers is represented by TP, a determination result is true and the percentage of incorrect answers is represented by FP, a determination result is false and the percentage of correct answers is represented by TN, and a determination result is false and the percentage of incorrect answers is represented by FN, the accuracy is an amount defined by (TP+TN)/(TP+TN+FP+FN), the precision is an amount defined by TP/(TP+FP), and the F1 value is an amount defined by 2TP/(2TP+FP+FN). In addition, the ROC curve is a curve drawn when parameters (a threshold value and the like) of determination are changed by taking a false positive rate FP/(FP+TN) on the horizontal axis and a true positive rate TP/(FP+TN) on the vertical axis. An ROC curve of a good model has a steep rise such that a false positive rate is low and a true positive rate is high, and an ROC curve of a model close to random determination approaches a straight line with an inclination of 45 degrees. The AUC is defined by the integration of an ROC curve (area under the curve).

The selection part 156 selects at least any one of the plurality of pieces of sub-training data 142 on the basis of the accuracy of determination. The selection part 156 may select sub-training data 142 having the highest accuracy of determination in a case where the training model 136 is trained by the training part 150 using each of the plurality of pieces of sub-training data 142. In a case where the accuracy of determination includes a plurality of amounts, the selection part 156 may select sub-training data 142 having the greatest specific amount (for example, an F1 value) or may select sub-training data 142 having the greatest average of a plurality of amounts (for example, an accuracy, a precision, and an F1 value).

In a case where a predetermined condition based on comparison between the accuracy of determination in a case where the training model 136 is trained by the training part 150 using the training data 140 and the accuracy of determination in a case where the training model 136 is trained by the training part 150 using the sub-training data 142 selected by the selection part 156 is satisfied, the division part 152, the measurement part 154, and the selection part 156 may recursively repeat the respective processes. For example, in a case where the accuracy of determination in a case where the training model 136 is trained by the training part 150 using the training data 140 is p1, and the accuracy of determination in a case where the training model 136 is trained by the training part 150 using the sub-training data 142 selected by the selection part 156 is p2, a predetermined condition may satisfy p1−p2≤Th. Here, Th is a positive value indicating an allowable threshold value of the amount of decrease in the accuracy of determination of the training model 136 due to a reduction in the training data 140. Further, in a case where an attempt to improve the accuracy of determination is made through training using the sub-training data 142, the allowable threshold value may be 0 or a negative value. The image determination device 100 divides the training data 140 into a plurality of pieces of sub-training data 142 by the division part 152 to measure the accuracy of determination in a case where the training model 140 is trained using the plurality of pieces of sub-training data 142 by the measurement part 154, and selects sub-training data 142 having a relatively high accuracy of determination by the selection part 156. In a case where the amount of change is less than the allowable threshold value even when the accuracy of determination is improved, maintained, or decreased, the image determination device 100 executes a series of processes of, for example, dividing the sub-training data 142 selected by the selection part 156 into a plurality of pieces of sub-training data by the division part 152 to measure the accuracy of determination in a case where the training model 140 is trained using the plurality of pieces of sub-training data by the measurement part 154, and selecting sub-training data having a relatively high accuracy of determination by the selection part 156. The image determination device 100 may repeat such a series of processes until the accuracy of determination decreases below an allowable threshold value. In this manner, it is possible to further suppress increases in time required for training processing and the amount of computation by decreasing the number of pieces of training data 140 in a stepwise manner while suppressing a reduction in the accuracy of determination or improving the accuracy of determination. Meanwhile, the accuracy of determination in a case where the training model 136 is trained by the training part 150 using each of the plurality of pieces of sub-training data 142 and the accuracy of determination in a case where the training model 136 is trained using the training data 140 may be compared with each other in accordance with, for example, a ratio instead of a difference in the accuracy of determination, or may be compared with each other by any method.

§ 3 Operation Example

Figure 4:
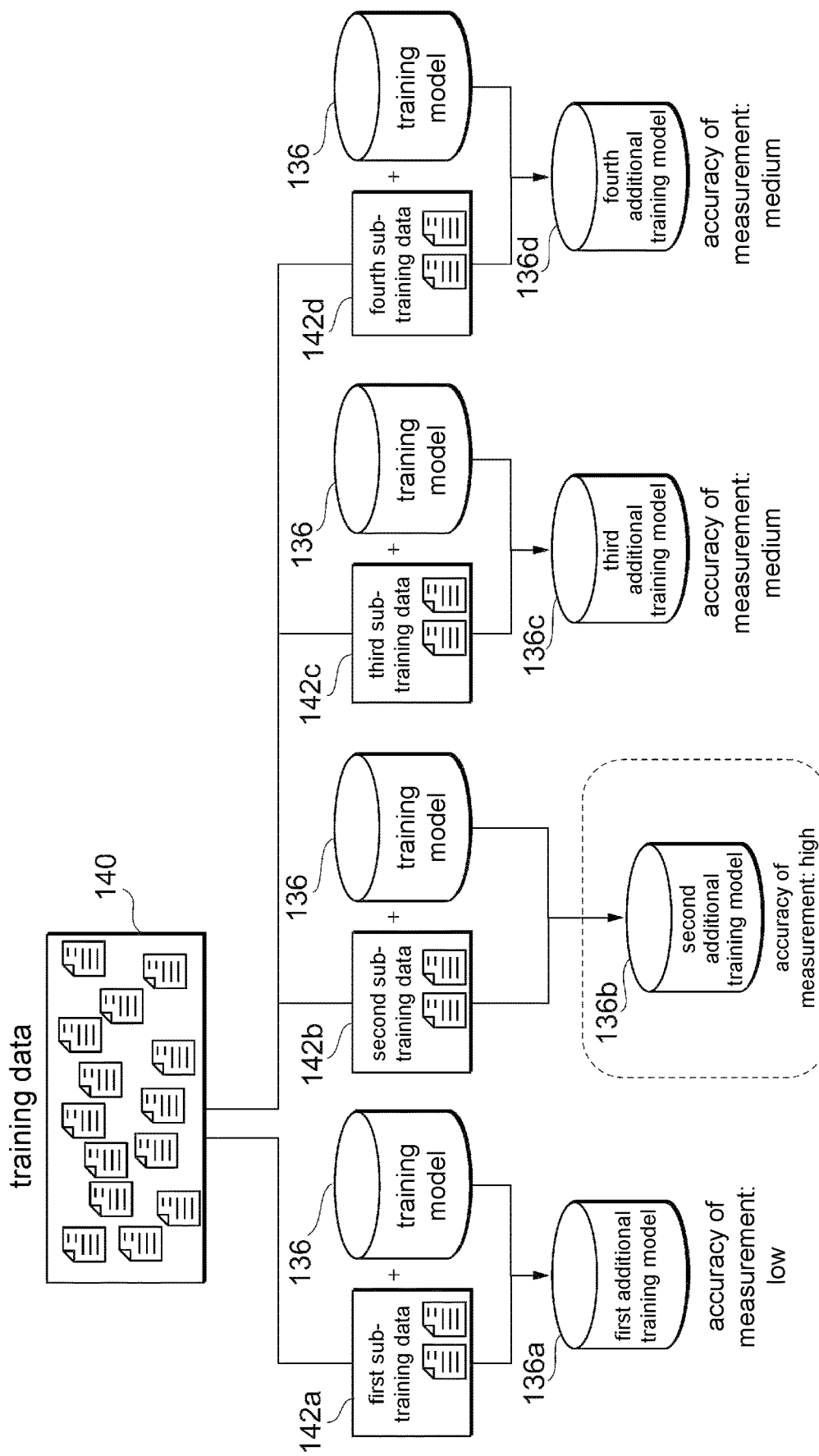
FIG. 4 is a diagram illustrating an example of division of training data which is performed by the image determination device according to the present embodiment.

FIG. 4 is a diagram illustrating an example of division of the training data 140 which is performed by the image determination device 100 according to the present embodiment. In the present example, a case where the training data 140 is divided into four pieces of sub-training data, that is, first sub-training data 142a, second sub-training data 142b, third sub-training data 142c, and fourth sub-training data 142d is shown.

The image determination device 100 divides the training data 140 into the first sub-training data 142a, the second sub-training data 142b, the third sub-training data 142c, and the fourth sub-training data 142d and causes the training model 136 to train using the respective sub-training data. In the present example, the image determination device 100 generates a first additional training model 136a generated by causing the training model 136 to train using the first sub-training data 142a, a second additional training model 136b generated by causing the training model 136 to train using the second sub-training data 142b, a third additional training model 136c generated by causing the training model 136 to train using the third sub-training data 142c, and a fourth additional training model 136d generated by causing the training model 136 to train using the fourth sub-training data 142d.

In the present example, the image determination device 100 selects the second sub-training data 142b in which the accuracy of determination of an additional training model becomes relatively higher. The image determination device 100 may repeat similar processing by comparing the accuracy of determination of the second additional training model 136b and the accuracy of determination of the training model 136 before additional training with each other and further dividing the second sub-training data 142b in a case where a predetermined standard is satisfied.

Figure 5:
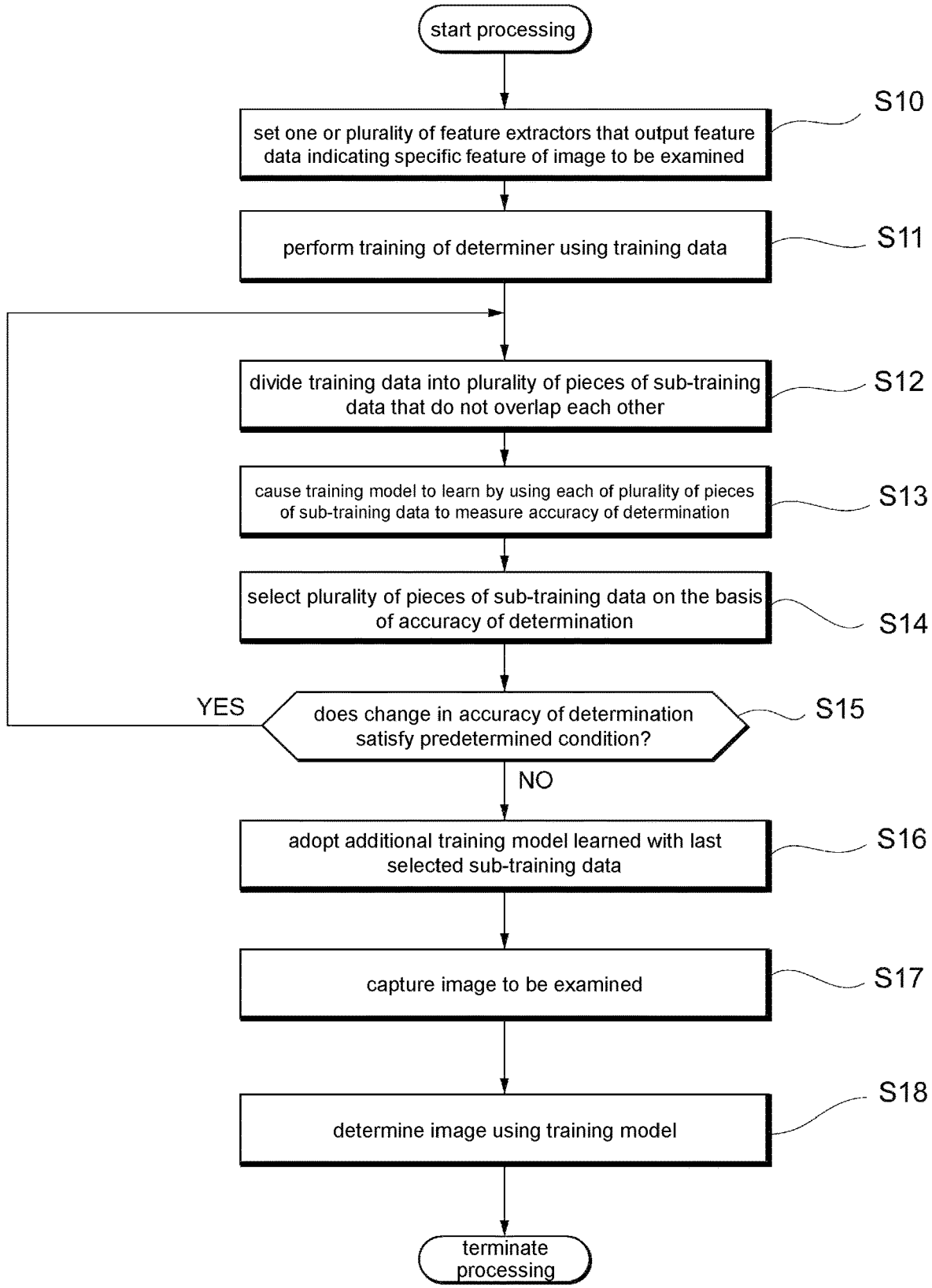
FIG. 5 is a flowchart of a first example of image determination processing executed by the image determination device according to the present embodiment.

FIG. 5 is a flowchart of a first example of image determination processing executed by the image determination device 100 according to the present embodiment. First, the image determination device 100 sets one or a plurality of feature extractors that output feature data indicating a specific feature of an image to be examined (S10) and causes a determiner to train using training data (S11). The training of the determiner is referred to as training of the training model 136.

Next, the image determination device 100 divides the training data 140 into a plurality of pieces of sub-training data 142 that do not overlap each other (S12). In addition, the image determination device 100 causes the training model 136 to train using each of the plurality of pieces of sub-training data 142 to measure the accuracy of determination (S13).

The image determination device 100 selects any one of the plurality of pieces of sub-training data 142 on the basis of comparison between the accuracy of determination of the training model 136 in a case where the training data 140 is used and the accuracy of determination of the training model 136 in a case where the sub-training data 142 is used (S14).

Thereafter, the image determination device 100 determines whether or not a change from the accuracy of determination of the training model 136 in a case where the training data 140 is used to the accuracy of determination of the training model 136 in a case where the selected sub-training data 142 is used satisfies a predetermined condition (S15). Here, the predetermined condition may include a condition that the accuracy of determination of the training model 136 in a case where the selected sub-training data 142 is used increases over a threshold value as compared to the accuracy of determination of the training model 136 in a case where the training data 140 is used or a condition that a reduction in the accuracy of determination is equal to or less than a threshold value. In a case where a change in the accuracy of determination satisfies a predetermined condition (S15: YES), the image determination device 100 executes the division of training data (S12), the training of a training model using sub-training data and the measurement of the accuracy of determination (S13), and the selection of sub-training data (S14) again using the selected sub-training data 142 as new training data.

On the other hand, in a case where a change in the accuracy of determination does not satisfy the predetermined condition (S15: NO), the image determination device 100 adopts an additional training model trained with the last selected sub-training data (S16). Thus, the training processing is terminated.

Thereafter, an image to be examined is captured by the camera 102 (S17). Then, the image determination device 100 inputs a newly captured image to one or a plurality of feature extractors and inputs output feature data to a determiner generated by additional training to determine the image using output data indicating a determination result related to the image (S18). Naturally, the capturing of an image (S17) and the determination processing (S18) may be repeatedly performed. Thus, the image determination processing is terminated.

Figure 6:
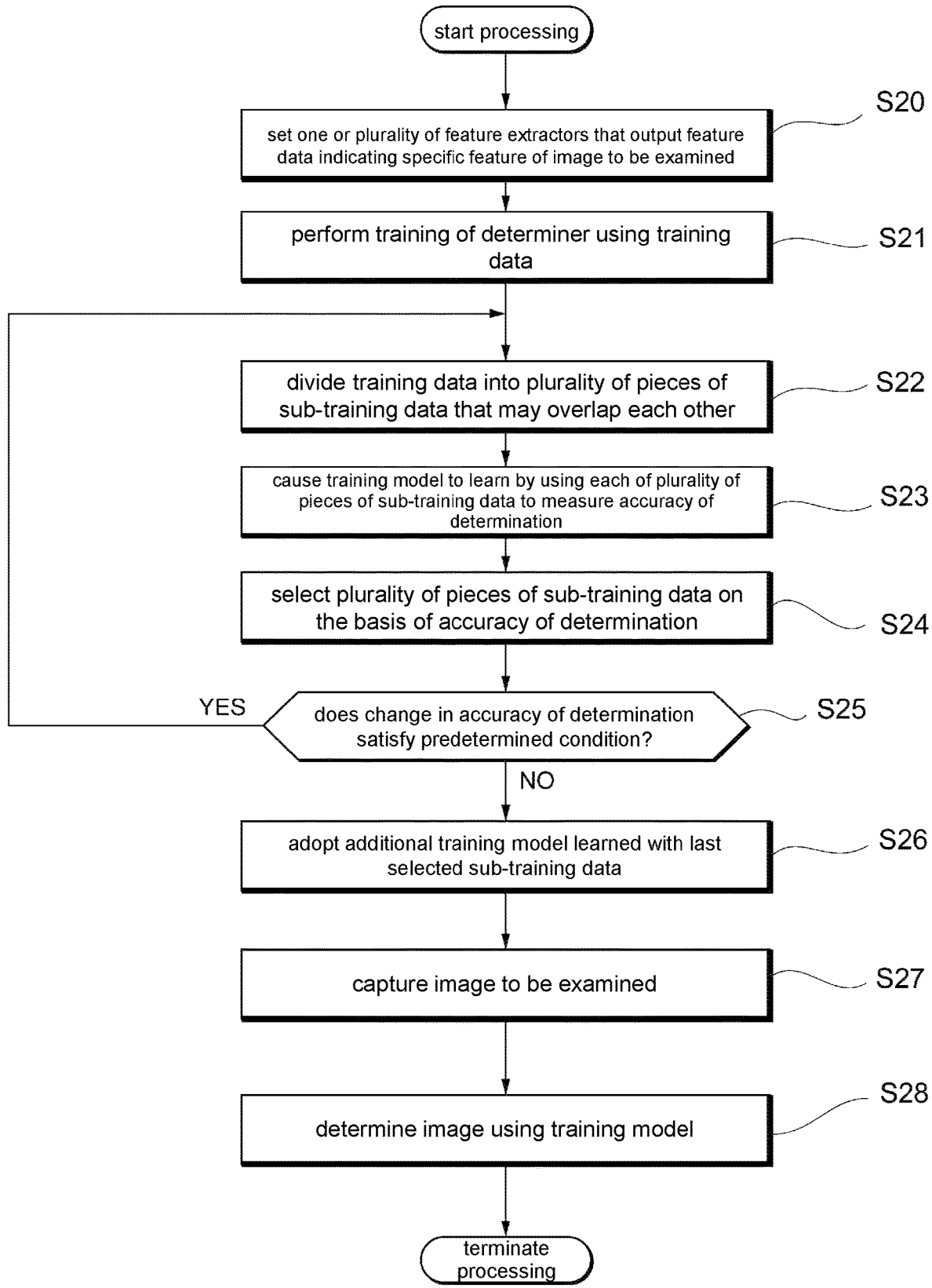
FIG. 6 is a flowchart of a second example of image determination processing executed by the image determination device according to the present embodiment.

FIG. 6 is a flowchart of a second example of image determination processing executed by the image determination device 100 according to the present embodiment. First, the image determination device 100 sets one or a plurality of feature extractors that output feature data indicating a specific feature of an image to be examined (S20) and causes a determiner to train using training data (S21). The training of the determiner is referred to as training of the training model 136.

Next, the image determination device 100 divides the training data 140 into a plurality of pieces of sub-training data 142 that may overlap each other (S22). Then, the image determination device 100 causes the training model 136 to train using each of the plurality of pieces of sub-training data 142 and measures the accuracy of determination (S23).

The image determination device 100 selects any one of the plurality of pieces of sub-training data 142 on the basis of comparison between the accuracy of determination of the training model 136 in a case where the training data 140 is used and the accuracy of determination of the training model 136 in a case where the sub-training data 142 is used (S24).

Thereafter, the image determination device 100 determines whether or not a change from the accuracy of determination of the training model 136 in a case where the training data 140 is used to the accuracy of determination of the training model 136 in a case where the selected sub-training data 142 is used satisfies a predetermined condition (S25). In a case where a change in the accuracy of determination satisfies the predetermined condition (S25: YES), the image determination device 100 executes the division of training data (S22), the training of a training model using sub-training data and the measurement of the accuracy of determination (S23), and the selection of sub-training data (S24) again using the selected sub-training data 142 as new training data.

On the other hand, in a case where a change in the accuracy of determination does not satisfy the predetermined condition (S25: NO), the image determination device 100 adopts an additional training model trained with the last selected sub-training data (S26). Thus, the training processing is terminated.

Thereafter, an image to be examined is captured by the camera 102 (S27). Then, the image determination device 100 inputs a newly captured image to one or a plurality of feature extractors and inputs output feature data to a determiner generated through additional training to determine the image using output data indicating a determination result related to the image (S28). Naturally, the capturing of the image (S27) and the determination processing (S28) may be repeatedly performed. Thus, the image determination processing is terminated.

Figure 7:
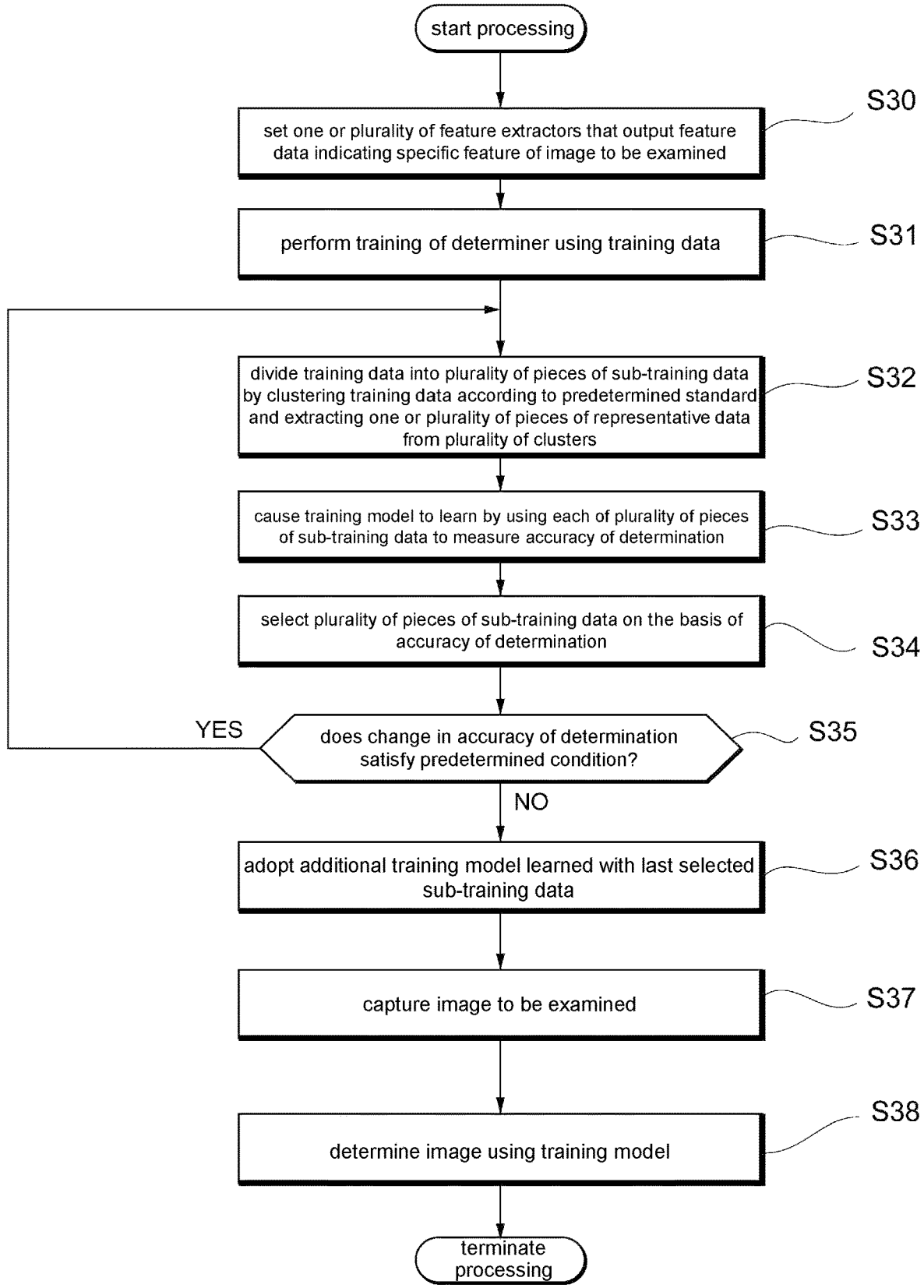
FIG. 7 is a flowchart of a third example of image determination processing executed by the image determination device according to the present embodiment.

FIG. 7 is a flowchart of a third example of image determination processing executed by the image determination device 100 according to the present embodiment. First, the image determination device 100 sets one or a plurality of feature extractors that output feature data indicating a specific feature of an image to be examined (S30) and causes a determiner to train using training data (S31). The training of the determiner is referred to as training of the training model 136.

Next, the image determination device 100 divides the training data 140 into a plurality of pieces of sub-training data 142 by clustering the training data 140 according to a predetermined standard and extracting one or a plurality of pieces of representative data from a plurality of clusters (S32). Then, the image determination device 100 causes the training model 136 to train using each of the plurality of pieces of sub-training data 142 to measure accuracy of determination (S33).

The image determination device 100 selects any one of the plurality of pieces of sub-training data 142 on the basis of comparison between the accuracy of determination of the training model 136 in a case where the training data 140 is used and the accuracy of determination of the training model 136 in a case where the sub-training data 142 is used (S34).

Thereafter, the image determination device 100 determines whether or not a change from the accuracy of determination of the training model 136 in a case where the training data 140 is used to the accuracy of determination of the training model 136 in a case where the selected sub-training data 142 is used satisfies a predetermined condition (S35). In a case where a change in the accuracy of determination satisfies the predetermined condition (S35: YES), the image determination device 100 executes the division of training data (S32), the training of a training model using sub-training data and the measurement of the accuracy of determination (S33), and the selection of sub-training data (S34) again using the selected sub-training data 142 as new training data.

On the other hand, in a case where a change in the accuracy of determination does not satisfy the predetermined condition (S35: NO), the image determination device 100 adopts an additional training model trained with the last selected sub-training data (S36). Thus, the training processing is terminated.

Thereafter, an image to be examined is captured by the camera 102 (S37). Then, the image determination device 100 inputs a newly captured image to one or a plurality of feature extractors and inputs output feature data to a determiner generated by additional training to determine the image using output data indicating a determination result related to the image (S38). Naturally, the capturing of an image (S37) and the determination processing (S38) may be repeatedly performed. Thus, the image determination processing is terminated.

The above-described embodiment is intended to facilitate the understanding of the present invention and is not intended to limitedly analyze the present invention. The components included in the embodiment and the dispositions, materials, conditions, shapes, sizes, and the like thereof are not limited to those exemplified and can be changed appropriately. In addition, configurations shown in different embodiments can be partially replaced or combined.

Meanwhile, a portion or the entirety of the above-described embodiment can be described as in the following additions, but is not limited to the following description.

[Addition 1]

An image determination device (100) including:
a training model (136) which outputs output data indicating a determination result related to an image to be examined on the basis of the image;
a training part (150) which causes the training model (136) to train to output the output data indicating label data associated with a training image in a case where the training image is input to the training model (136) using training data including the training image and the label data;
a division part (152) which divides the training data into a plurality of pieces of sub-training data;
a measurement part (154) which measures the accuracy of determination in a case where the training model (136) is trained by the training part (150) using each of the plurality of pieces of sub-training data; and
a selection part (156) which selects at least one of the plurality of pieces of sub-training data on the basis of the accuracy of determination.

[Addition 2]

The image determination device (100) according to addition 1, wherein the division part (152), the measurement part (154), and the selection part (156) recursively repeat respective processes in a case where a predetermined condition based on comparison between accuracy of determination in a case where the training model (136) is trained by the training part (150) using the training data and the accuracy of determination in a case where the training model (136) is trained by the training part (150) using the sub-training data selected by the selection part (156) is satisfied.

[Addition 3]

The image determination device (100) according to addition 1 or 2, wherein the division part (152) divides the training data into the plurality of pieces of sub-training data that do not overlap each other.

[Addition 4]

The image determination device (100) according to addition 1 or 2, wherein the division part (152) divides the training data into the plurality of pieces of sub-training data that may overlap each other.

[Addition 5]

The image determination device (100) according to addition 1 or 2, wherein the division part (152) divides the training data into the plurality of pieces of sub-training data by clustering the training data according to a predetermined standard and extracting one or a plurality of pieces of representative data from a plurality of clusters.

[Addition 6]

An image determination method including:
causing a training model (136) which outputs output data indicating a determination result related to an image to be examined on the basis of the image to train to output the output data indicating label data associated with a training image in a case where the training image is input to the training model (136) using training data including the training image and the label data;
dividing the training data into a plurality of pieces of sub-training data;
measuring the accuracy of determination in a case where the training model (136) is trained using each of the plurality of pieces of sub-training data; and
selecting at least one of the plurality of pieces of sub-training data on the basis of the accuracy of determination.

[Addition 7]

An image determination program causing a computation part included in an image determination device (100) to function as:
a training model (136) which outputs output data indicating a determination result related to an image to be examined on the basis of the image;
a training part (150) which causes the training model (136) to train to output the output data indicating label data associated with a training image in a case where the training image is input to the training model (136) using training data including the training image and the label data;
a division part (152) which divides the training data into a plurality of pieces of sub-training data;
a measurement part (154) which measures the accuracy of determination in a case where the training model (136) is trained by the training part (150) using each of the plurality of pieces of sub-training data; and
a selection part (156) which selects at least one of the plurality of pieces of sub-training data on the basis of the accuracy of determination.

REFERENCE SIGNS LIST

1 Image determination system
2 Belt conveyor
4 Work piece
6 Imaging visual field
8 High-order network
10 PLC
12 Database device
100 Image determination device
102 Camera
104 Display
106 Keyboard
108 Mouse
110 Processor
112 Main memory
114 Camera interface
116 Input interface
118 Display interface
120 Communication interface
122 Internal bus
130 Storage
132 Image processing program
134 OS
136 Training model 136a First additional training model
136b Second additional training model
136c Third additional training model
136d Fourth additional training model
138 Input image
140 Training data
142 Sub-training data
142a First sub-training data
142b Second sub-training data
142c Third sub-training data
142d Fourth sub-training data
150 Training part
152 Division part
154 Measurement part
156 Selection part

What is claimed is:

1. An image determination device comprising:
a memory, configured to store a training model which outputs output data indicating a determination result related to an image to be examined on the basis of the image; and
a processor, configured to:
perform a training process which causes the training model to train to output the output data indicating label data associated with a training image in a case where the training image is input to the training model using training data including the training image and the label data;
perform a division process which divides the training data into a plurality of pieces of sub-training data;
perform a measurement process which measures the accuracy of determination in a case where the training model is trained in the training process using each of the plurality of pieces of sub-training data;
perform a selection process which selects at least one of the plurality of pieces of sub-training data on the basis of the accuracy of determinations and
in a case where a predetermined condition based on comparison between accuracy of determination when the training model is trained in the training process using the training data and the accuracy of determination when the training model is trained in the training process using the sub-training data selected in the selection process is satisfied, recursively repeat the division process, the measurement process, and the selection process.

2. The image determination device according to claim 1, wherein the processor divides the training data into the plurality of pieces of sub-training data that do not overlap each other in the division process.

3. The image determination device according to claim 1, wherein the processor divides the training data into the plurality of pieces of sub-training data that may overlap each other in the division process.

4. The image determination device according to claim 1, wherein the processor divides the training data into the plurality of pieces of sub-training data by clustering the training data according to a predetermined standard and extracting one or a plurality of pieces of representative data from a plurality of clusters in the division process.

5. An image determination method comprising:
performing a training process which causes a training model which outputs output data indicating a determination result related to an image to be examined on the basis of the image to train to output the output data indicating label data associated with a training image in a case where the training image is input to the training model using training data including the training image and the label data;
performing a division process which divides the training data into a plurality of pieces of sub-training data;
performing a measurement process which measures the accuracy of determination in a case where the training model is trained using each of the plurality of pieces of sub-training data;
performing a selection process which selects at least one of the plurality of pieces of sub-training data on the basis of the accuracy of determinations and
in a case where a predetermined condition based on comparison between accuracy of determination when the training model is trained using the training data and the accuracy of determination when the training model is trained using the sub-training data is satisfied, recursively repeating the division process, the measurement process, and the selection process.

6. A non-transitory computer readable medium storing an image determination program causing a processor included in an image determination device to function as:
store a training model which outputs output data indicating a determination result related to an image to be examined on the basis of the image in a memory;
perform a training process which causes the training model to train to output the output data indicating label data associated with a training image in a case where the training image is input to the training model using training data including the training image and the label data;
perform a division process which divides the training data into a plurality of pieces of sub-training data;
perform a measurement process which measures the accuracy of determination in a case where the training model is trained in the training process using each of the plurality of pieces of sub-training data;
perform a selection process which selects at least one of the plurality of pieces of sub-training data on the basis of the accuracy of determination, and
in a case where a predetermined condition based on comparison between accuracy of determination when the training model is trained in the training process using the training data and the accuracy of determination when the training model is trained in the training process using the sub-training data selected in the selection process is satisfied, recursively repeat the division process, the measurement process, and the selection process.

* * * * *